I. H. REINER.
Harrow.
No. 227,836.  Patented May 18, 1880.
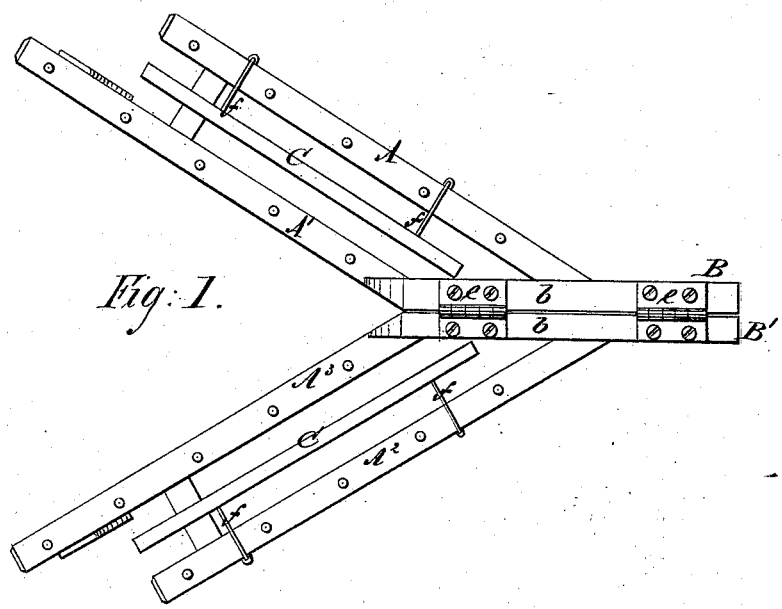
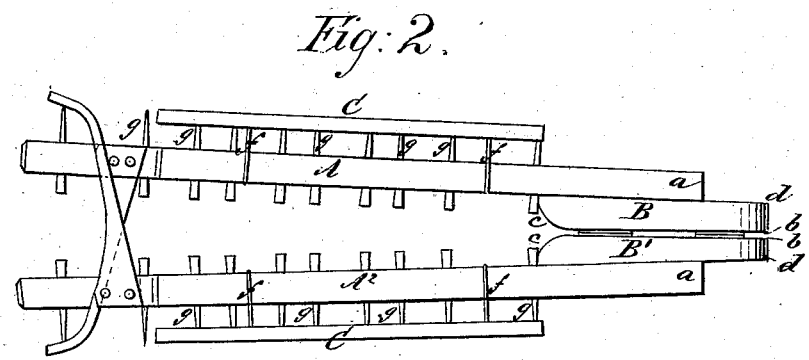
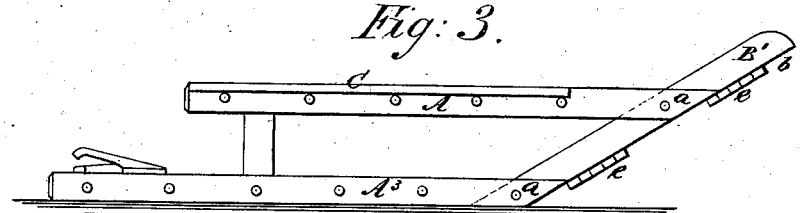
WITNESSES:
A. Schehl.
C. Sedgwick
INVENTOR:
I. H. Reiner
BY Munn & Co.
ATTORNEYS.

United States Patent Office.

ISAIAH H. REINER, OF LINE LEXINGTON, PENNSYLVANIA.

HARROW.

SPECIFICATION forming part of Letters Patent No. 227,836, dated May 18, 1880.

Application filed October 29, 1879.

*To all whom it may concern:*

Be it known that I, ISAIAH H. REINER, of Line Lexington, in the county of Montgomery and State of Pennsylvania, have invented a new and Improved Harrow, of which the following is a specification.

The object of my invention is to provide a harrow which can be readily transformed into a sled to facilitate its transportation from place to place, and which can also be used to carry grain and agricultural implements to and from the place where they are used.

In the accompanying drawings, Figure 1 is a top view of the harrow open. Fig. 2 is a similar view of the harrow arranged as a sled, and Fig. 3 is a side elevation of the harrow arranged as a sled.

Similar letters of reference indicate corresponding parts.

Referring to the drawings, A A' A² A³ are the side bars of the harrow, the ends $a$ whereof are joined respectively to the under side of beams B B' at acute angles to said beams, so that when the side bars are thrown down they form a V-shaped harrow, such as shown in Fig. 1.

The upper surface or side, $b$, of beams B B' tapers from their rear ends, $c$, toward their forward ends, $d$, and said beams B B' are connected together by hinges $e\ e$, fixed to the upper sides, $b$. By connecting the side bars with the double beam they can be thrown up from a horizontal position, as in Fig. 1, to a vertical position, such as that they occupy in Figs. 2 and 3, and when in this position the bottom bars, A' A³, rest on the ground, while the beams B B' project upward from the ground at an obtuse angle to the side bars, as shown in Fig. 3.

The beams B B' and lower side bars, A' A³, form, when adjusted to the position just described, runners, while the upper side bars, A A², serve the same purpose as the side bars of a sled. By arranging the harrow in this manner it can be easily drawn about from place to place in the manner of a sled. It can also be employed to transport implements and grain to the place where they are to be used, by putting them on the side bars A A².

The guards are composed of bars C C connected with the harrow side bars, A A², by links $f$.

When the side bars are thrown down to form a harrow the guards are thrown over, so that the bars C rest between side bars, A A' A² A³, respectively, as shown in Fig. 1; but when arranged as a sled the bars C are thrown out, where they are sustained in a horizontal position by links $f$ bearing on top of side bars, A A², and the bars C, extending beyond the teeth $g$, prevent contact with the points of said teeth, whereby men and animals are guarded against injury by the teeth of the harrow.

The connections of the said bars A A', &c., with the under side of beams B B', and hinging the beams together by their upper side, $b$, has the effect of separating the two parts of the harrow when thrown up to a vertical position to the extent of the combined thickness of beams B B', whereby sufficient width is given to the harrow when arranged as a sled to enable it to stand steady, and the tapering of the beams B B' makes the space between two sections greater at the rear than in front, as shown in Fig. 2.

Having thus described my invention, I claim as new and desire to secure by Letters Patent—

A harrow consisting of the side bars, the median beams hinged together, the guards C, and the links $f$, as shown and described.

ISAIAH H. REINER.

Witnesses:
 J. M. JENKINS,
 MARY HIGGINS.